(12) United States Patent
Goldstein et al.

(10) Patent No.: US 7,360,319 B1
(45) Date of Patent: Apr. 22, 2008

(54) DIP STICK

(75) Inventors: Fredric Goldstein, Nacka (SE); Robert Murray Barto, Jr., Palm Beach Gardens, FL (US)

(73) Assignee: Group One Ltd., Isle of Man (GB)

( * ) Notice: Subject to any disclaimer, the term of this patent is extended or adjusted under 35 U.S.C. 154(b) by 6 days.

(21) Appl. No.: 11/553,644

(22) Filed: Oct. 27, 2006

(51) Int. Cl.
*G01F 23/04* (2006.01)

(52) U.S. Cl. .................. 33/725; 15/220.4

(58) Field of Classification Search .......... 33/722–731; 15/220.4
See application file for complete search history.

(56) References Cited

U.S. PATENT DOCUMENTS

| | | | |
|---|---|---|---|
| 2,855,682 A | 10/1958 | Norgard | |
| 3,098,254 A * | 7/1963 | Rose | 33/725 |
| 3,686,702 A * | 8/1972 | Jordan | 33/725 |
| 3,703,038 A | 11/1972 | Smith | |
| 4,891,859 A | 1/1990 | Tremblay | |
| 4,942,669 A | 7/1990 | Schnedl | |
| 4,975,998 A | 12/1990 | Anderson et al. | |
| 5,099,584 A | 3/1992 | Williams | |
| 5,485,681 A * | 1/1996 | Hitchcock | 33/731 |
| 5,598,602 A | 2/1997 | Gibson | |
| 5,765,255 A | 6/1998 | Bychkowsky | |
| 6,018,882 A | 2/2000 | Brousseau | |
| 6,289,601 B1 * | 9/2001 | Bricker | 33/726 |

FOREIGN PATENT DOCUMENTS

JP  03046519 A  *  2/1991

* cited by examiner

*Primary Examiner*—G. Bradley Bennett
(74) *Attorney, Agent, or Firm*—Carlson, Gaskey & Olds (57) ABSTRACT

A dip stick assembly has a dip stick and a housing that receives the dip stick. A wiper is selectively engageable with the dip stick. The wiper has an engaged position and a disengaged position. In the engaged position, the wiper is in contact with the dip stick. In the disengaged position, the wiper is out of contact with the dip stick. The wiper is resiliently biased into the engaged position with dip stick. A block maintains the wiper in the disengaged position when in a blocking position and permits the wiper to be in the engaged position when in the unblocking position.

20 Claims, 7 Drawing Sheets

DIP STICK

BACKGROUND OF THE INVENTION

This invention relates to a dip stick assembly for a vehicle.

A dip stick is used to measure oil in an oil pan or, more broadly, an oil reservoir of a vehicle. Typically, the dip stick remains inserted in a housing that is connected to the oil reservoir. The dip stick will typically have some markings, which serve to reflect the level of oil in the reservoir. During normal operation of the vehicle, oil will splash onto the dip stick at points that do not accurately reflect the oil level. When the oil level is checked, the dip stick is removed from the housing and is typically wiped clean with a cloth. The dip stick is then reinserted into the housing and then removed again to read the oil level, which then provides an accurate reflection of the oil level in the reservoir.

This technique for checking the oil level in a vehicle has its drawbacks. Specifically, the technique is messy. One must have ready some way to wipe the dip stick clean, which is typically a cloth, paper towel or rag. Also, the cloth or such used to wipe the dip stick must be thrown away because it is difficult or impractical to clean, both wasting the cloth and causing the inconvenience of its disposal. Oil is also wasted because oil on the dip stick is left on the cloth rather than returned to the oil reservoir.

There have been efforts to simplify this process. Electronic systems exist that measure the level of oil in the vehicle. However, these systems are often unreliable or expensive. In addition, they normally only indicate if the level is low, not how low or how much oil is required to reach the proper level. Manual systems also exist that include wiping mechanisms on the housing. Although preferable to wiping the dip stick with a rag, these assemblies may be complicated, awkward to use or expensive.

A need therefore exists for a dip stick assembly that simplifies the process for cleaning the dip stick without great expense or inconvenience.

SUMMARY OF THE INVENTION

The invention comprises a dip stick assembly and related technique. The dip stick has a measure for reading the oil level of an oil reservoir of a vehicle. The dip stick is received in a housing, which allows the dip stick to be inserted into the oil reservoir. To facilitate cleaning, the dip stick has wipers attached to the housing. The wipers have an engaged position and a disengaged position. In the engaged position, the wiper is in contact with the dip stick. In the disengaged position, the wiper is out of contact with the dip stick.

The wipers may be resiliently biased into the engaged position so that the dip stick is automatically wiped when removed from the housing. A block is provided to prevent the wiper from moving into the engaged position. The block is moveable between a blocking position and an unblocking position. In the blocking position, the block maintains the wiper in the disengaged position, while, in the unblocking position, the block permits the wiper to move to the engaged position.

The inventive dip stick assembly provides an automatic technique for cleaning the dip stick assembly. The dip stick is placed in communication with an oil reservoir. The wipers are biased into engagement with the dip stick. The wiper, however, is prevented from engaging the dip stick by the block. The block is then removed to allow the wiper to contact the dip stick and wipe it. The dip stick is then reinserted. The block is returned to the blocking position and left there. When the dip stick is removed, the wipers remain in the disengaged position, thereby allowing the dip stick to be removed without wiping, thereby providing a simple and inexpensive assembly and technique for cleaning and reading the dip stick.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
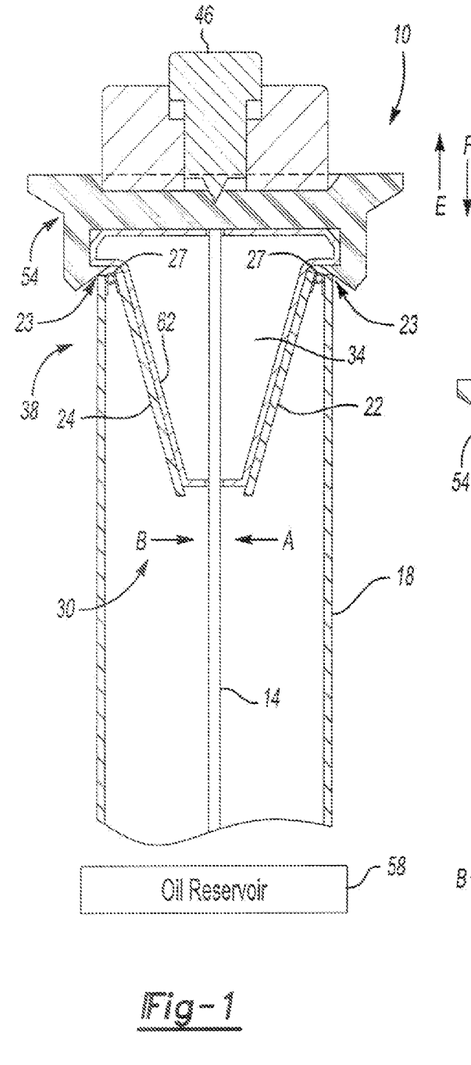
FIG. 1 illustrates a version of the inventive dip stick assembly, including dip stick, housing, wipers and block.

FIG. 1 illustrates inventive dip stick assembly 10. Dip stick assembly 10 has dip stick 14 disposed in housing 18 as shown. Housing 18 is connected to oil reservoir 58 in a vehicle. Dip stick 14 has markings 15 that permit the fluid level of oil reservoir to be read by dip stick 14 as known.

Figure 2:
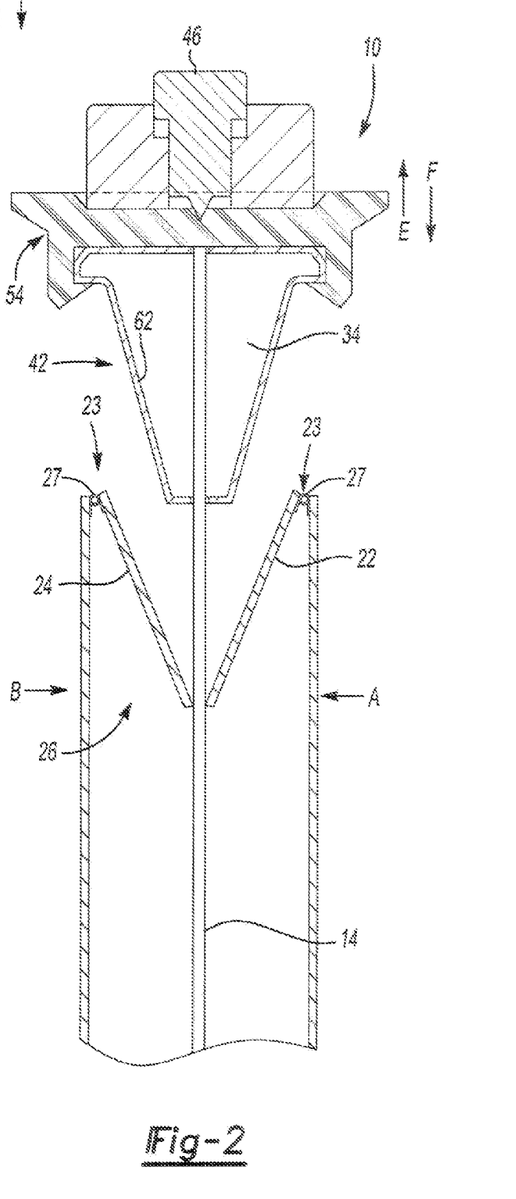
FIG. 2 illustrates the dip stick assembly of FIG. 1 in which the wipers are in the engaged position to wipe the dip stick.

In contrast to existing assemblies, dip stick assembly 10 has wipers, such as wipers 22 and 24, which pivot between engaged position 26 as shown in FIG. 2 and disengaged position 30 as shown in FIG. 1. Wipers 22, 24 are connected to housing 18 and are resiliently biased by springs 27 to engaged position 26, which is in contact with dip stick 14 as shown in FIG. 2. Wiper 22 is connected to housing 18 at pivot 23 while wiper 24 is connected to housing 18 at pivot 25. Within pivot 23 and pivot 25 are springs 27 that urge wiper 22 in the direction of arrow A and urge wiper 24 in direction of arrow B when wiper 22 and 24 are in the disengaged position 30 as shown in FIG. 1.

Maintaining wiper 22 and 24 from engaged position 26 is block 34. Block 34 comprises a frustroconical hollow insert that is sized to be received within housing 18. Block 34 has inclined surface 62 that engages wipers 22 and 24 and facilitates insertion of block 34 between wipers 22, 24.

When block 34 is withdrawn in the direction of arrow E, as shown in FIG. 2, to unblocking position 42, wipers 22 and 24 move in the direction of arrow A and the direction of arrow B, respectively, because of their spring bias toward engaged position 26. In engaged position 26, as shown in FIG. 2, wiper 22 and 24 contact dip stick 18 so that when dip stick 14 is withdrawn, wipers 22 and 24 wipe excess oil off dip stick 14. In this way, wiper 22 and 24 automatically engage dip stick 14 so that dip stick 14 may be wiped simply by withdrawing block 34 and dip stick 14 in the direction of arrow E. It will be appreciated that the blocking structure may comprise any form which prevents the engagement of the wipers with the dip stick, in which the block may also be, by way of example, a flat projection. Furthermore, the housing for the wiper and blocking structure need not be circular, as is normal for the pipe leading into the oil reservoir, but may also be rectangular or square. Similarly, the wipers need not have the shape of standard wipers but may additionally be a resilient slot or an orifice which will retain or revert back to its original shape or position after a blocking structure is inserted in order to perform the repeated function of wiping the dip stick in a subsequent oil check. A wiper then is any structure which performs the function of wiping.

As shown in FIG. 2, wiper 22 and 24 are located within housing 18. This permits oil wiped from dip stick 14 to be returned to oil reservoir 58 because wiped oil remains in housing 18. After dip stick 14 is withdrawn in the direction of arrow E, it may then be reinserted into housing 18 by moving it in the direction of arrow F. Now, dip stick 14 is exposed to oil reservoir 58 after having been wiped by wiper 22 and 24.

Figure 3:
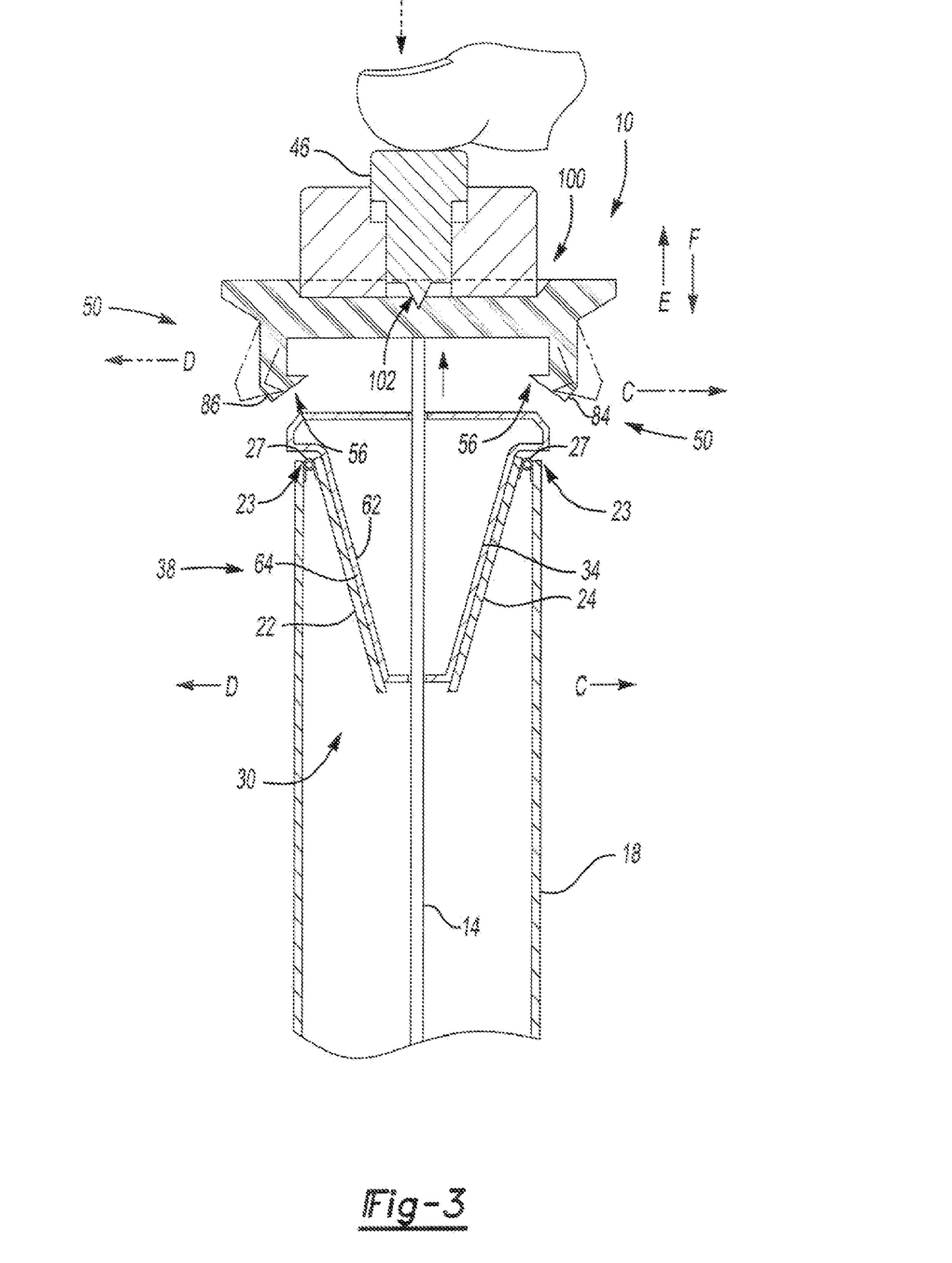
FIG. 3 illustrates the block of FIGS. 1 and 2 in a blocking position to prevent the wipers from wiping the dip stick.

Block 34 is releasably coupled to dip stick 14 by catches 84, 86, which are formed as part of cap 100. Cap 100 is connected to dip stick 14. Block 34 is shown in unreleased position 54 in FIGS. 1 and 2. Cap 100 and catches 84, 86 are made of a resilient material, such as plastic. Release 46 is slideably received in cap 100 and may move in the direction of arrow F to apply pressure to break 102, which is a channel in the plastic to permit flexing of catches 84, 86 in the direction of arrows C and D, respectively. To prevent dip stick 14 from being wiped again, as shown in FIG. 3, release 46 is actuated by depressing it in the direction of arrow F. This action causes catches 84, 86 to bend resiliently in the direction of arrow C for catch 84 and in the direction of arrow D for catch 86. Catches 84 and 86 accordingly pivot away from block 38 to release block 34 to released position 50 wherein block 34 is no longer coupled to catches 84 and 88 and consequently dip stick 14. Hence, when dip stick 14 is moved in the direction of arrow E and lifted from housing 18, as shown in FIG. 3, block 34 is left in blocking position 38 to prevent wiper 22 and 24 from contacting dip stick 14, maintaining wipers 22, 24 in disengaged position 30. Hence, when dip stick 14 is withdrawn, wipers 22 and 24 will not wipe dip stick 14. Dip stick 14 may then be withdrawn with oil unwiped from dip stick, thereby allowing dip stick 14 to be read for an accurate measurement of oil in oil reservoir 58. As shown, block 34 has a hollow 64 that permits dip stick 14 to slide freely within block 34 when block 34 is released from cap 100.

FIG. 2 illustrates an alternative version of the inventive dip stick assembly. Here, dip stick assembly 70 has block 60. Block 60 has inclined surface 62 as well as curved portion 66. Like block 34, block 60 is hollow and slideably receives dip stick 14. Cap 96 is secured to dip stick 14. Furthermore, assembly 70 has release 92 that when actuated, moves catch 94 by lever 97 in the direction of arrow D to release block 34 from engagement with cap 96. Ball bearings are provided on cap 96 to permit block 60 to be slideably received within cap 96.

Figure 4:
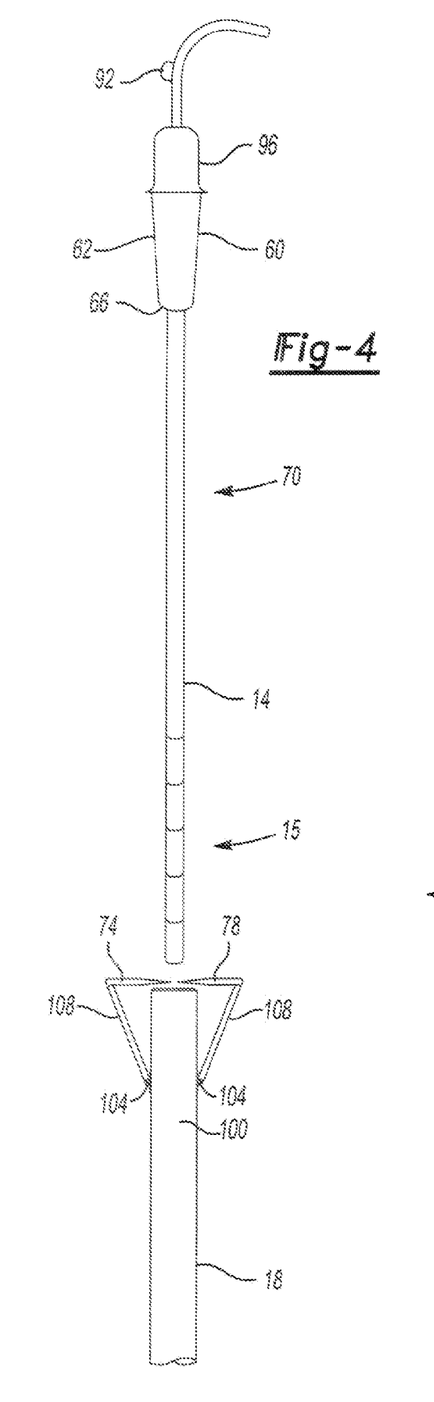
FIG. 4 illustrates an alternative version of the inventive dip stick assembly.
Figure 5:
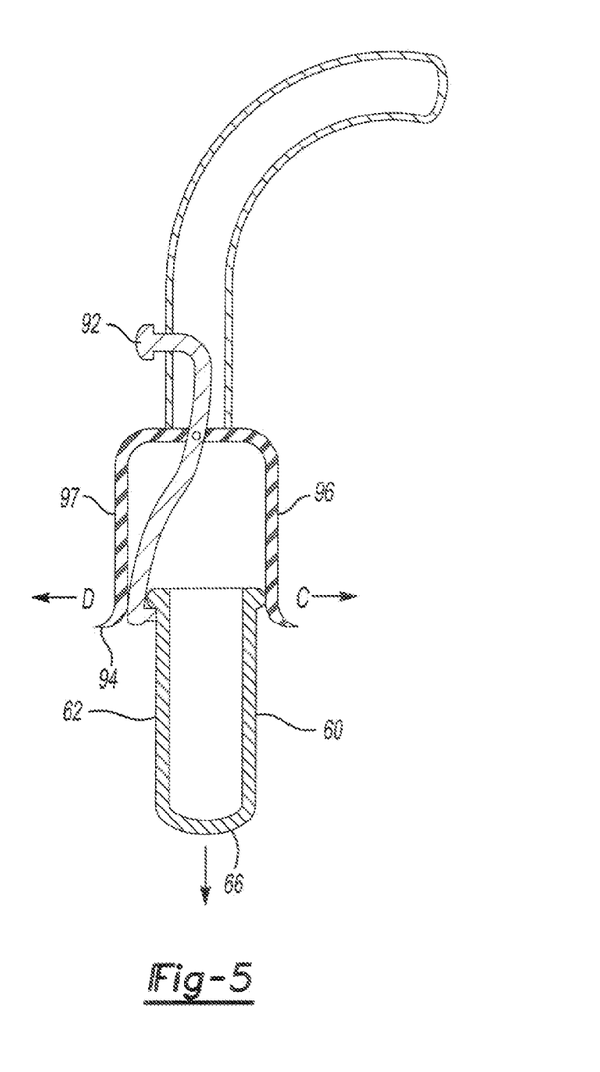
FIG. 5 illustrates a block and release of the version of FIG. 4.

In addition, as shown in FIG. 4, wipers 74 and 78 are attached externally to housing 18, thereby permitting wipers 74 and 78 to be added to a vehicle in the aftermarket. They are mounted by fastener 100, which has springs that are attached to housing 18 and arms 108. As in the previous version, wiper 74 and 78 are resiliently biased to engage dip stick 14 when dip stick is inserted. Dip stick 14 is operated in the same way as dip stick assembly 10.

Figure 6:
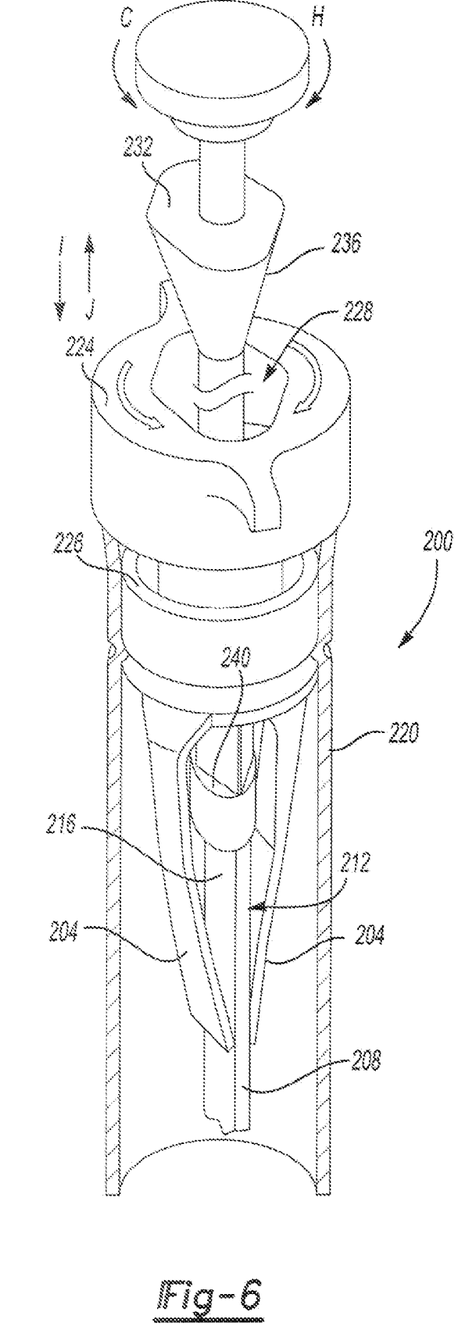
FIG. 6 illustrates another version of the inventive dip stick assembly with dip stick in unblocking position.
Figure 7:
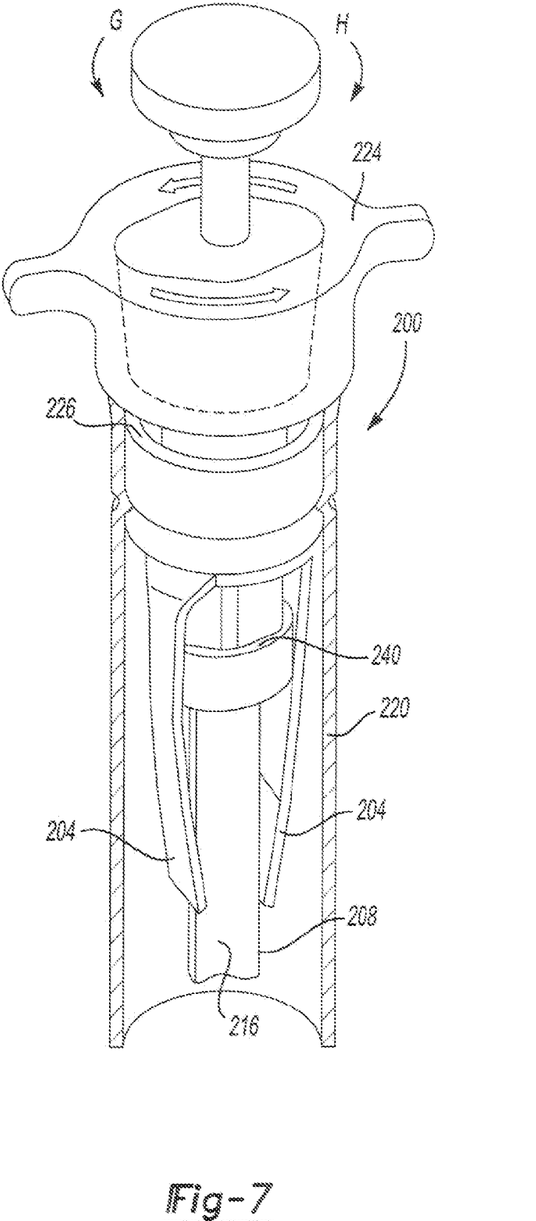
FIG. 7 illustrates the version of the inventive dip stick assembly of FIG. 6 with dip stick in blocking position.

FIGS. 6 and 7 illustrate another version of the inventive dip stick assembly. Dip stick assembly 200 has dip stick 208 disposed in housing 220, which is connected to an oil reservoir as known. Dip stick 208 is long enough to extend into the oil reservoir to accurately gauge the oil level. Disposed in housing 220 is wiper support 226, which is locked in place to prevent movement in the direction of arrows I or J or rotation in the direction of arrows G or H. Wiper support 226 has wipers 204. Like the other versions of the invention, dip stick assembly 200 has wipers 204 resiliently biased into engagement with dip stick.

In FIG. 6, dip stick 208 is wiped by lifting dip stick 208 in the direction of arrow J. This action causes dip stick 208 to be wiped by wipers 204, which are resiliently biased into engagement with face 212 and face 216 of dip stick 208. Face 212 and face 216 has markings, such as a standard gauge for measuring oil level. Hence, faces 212 and 216 of dip stick 208 are cleaned before reinsertion into oil reservoir. Dip stick 208 is returned to a position where it is in contact with the oil level by lowering dip stick 208 in the direction of arrow I. Dip stick 208 is guided by guide 224 that has hole 228 shaped to receive mating component 232 so that when mating component 232 is returned to hole 228, face 212 and face 216 are in contact with wipers 204. This feature ensures the correct orientation of dip stick 208 and its faces 212, 216 relative to wipers 204 so that wipers 204 may contact face 212 and face 216 to clean the surfaces of oil.

Also, the cleaning of dip stick 208 may be done without removal of dip stick 208 from housing 220, thereby ensuring wiped oil remains within housing 220. Dip stick 208 is provided with upper stop 236 and lower stop 240. Upper stop 236 prevents dip stock 208 from traveling in the direction of arrow I beyond the point where dip stick 208 is calibrated with markings so that dip stick 208 will accurately measure the oil level. Guide 224 holds upper stop 236 at this point by preventing stop 236 from passing through hole 228 because of hole 228's tapering shape. Lower stop 240 prevents dip stick 208 from being removed from housing 220 by its interference with wiper support 226.

Figure 7A:
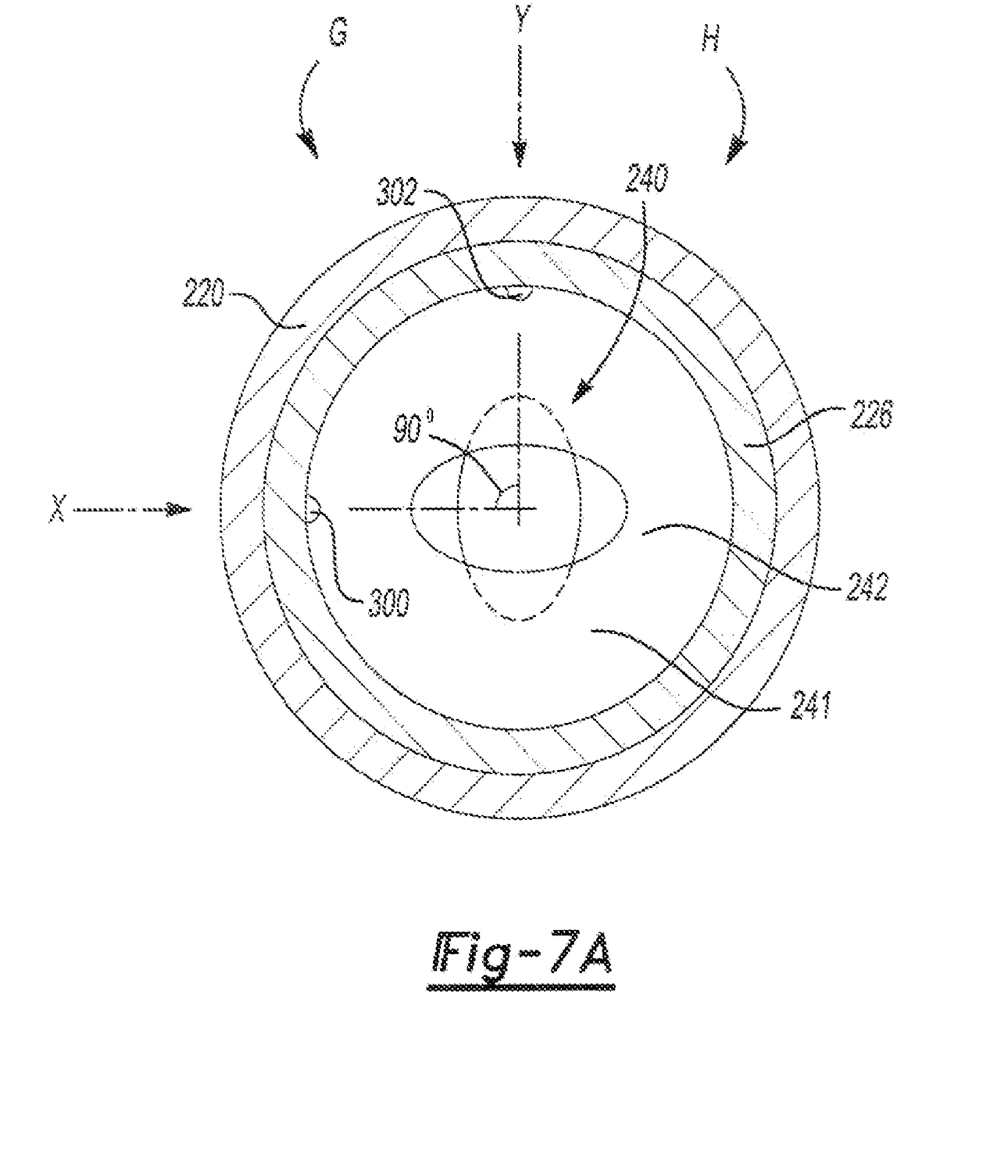
FIG. 7A illustrates a plan view of the wiper support for the wipers of the dip stick assembly of FIGS. 5-7.

FIG. 7A illustrates a plan view of housing 220 and wiper support 226 in the direction of arrow I, as shown in the position of FIG. 6. As can be seen, wiper support 226 has a base 241 with hole 242 which is shaped and sized like wiper support 240 but, in this position, rotated about ninety degrees (90°) from the mating shape of wiper support 240. In this position of FIGS. 6 and 7A, wiper support 240 is blocked from moving past base 241. Hence, upper stop 232 is prevented from traveling beyond guide 224 while lower stop 240 is prevented from traveling past base 241 of wiper support 240. In this way, dip stick 208 can be pumped down in the direction of arrow I and pulled up in the direction of arrow J to clean dip stick 208 without removing it completely from its housing. It will be understood by one of ordinary skill in the art that wipers 204 must contact dip stick 208 at a point low enough so that when lower stop 240 is at the point of base 241, wipers 204 will have wiped all of the level markings.

Figure 8:
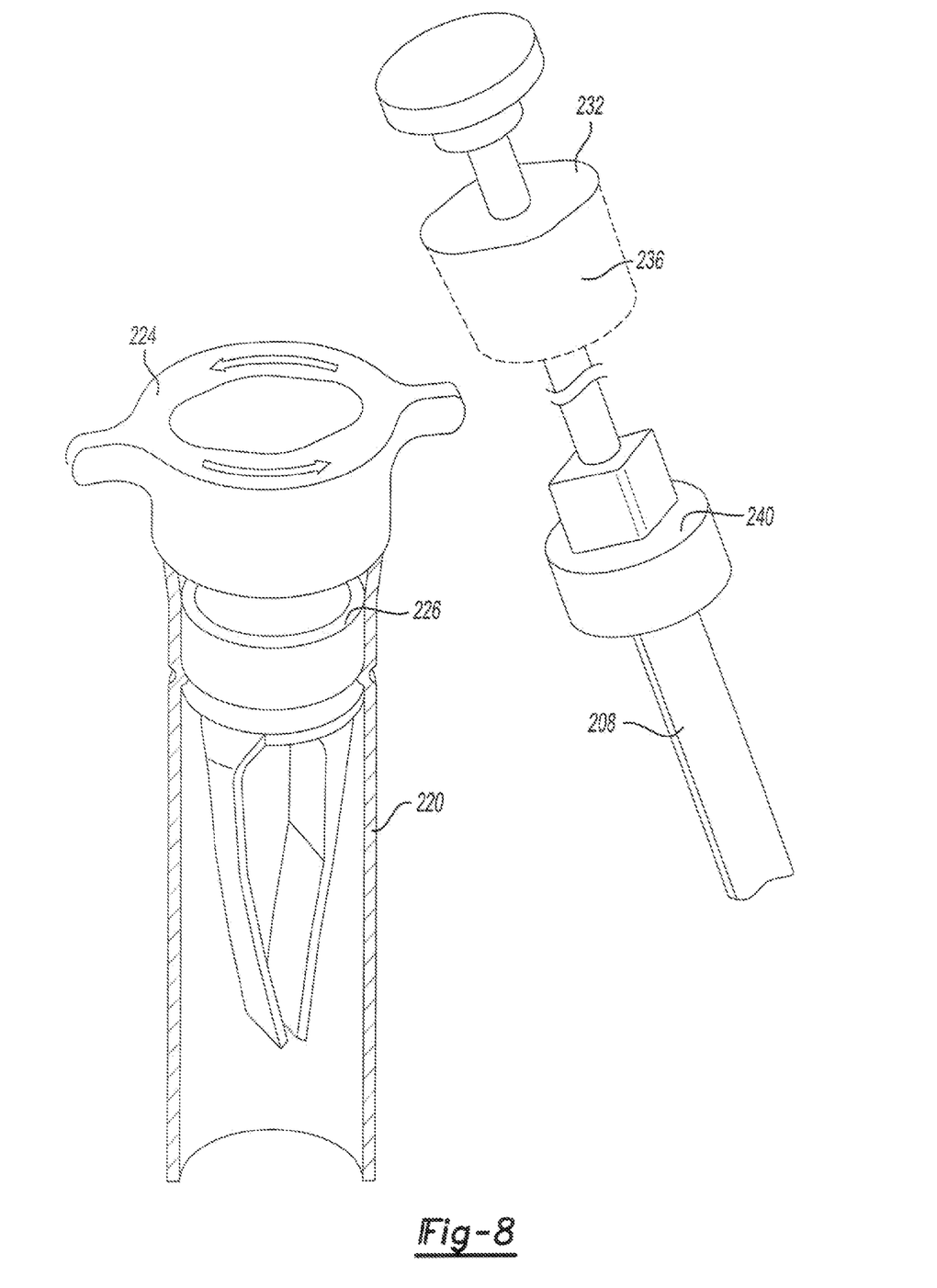
FIG. 8 illustrates the version of the inventive dip stick assembly of FIGS. 6 and 7 with dip stick removed from its housing.

Guide 224 is rotatably mounted to housing 220 to allow its movement in the direction of arrows G or H but to prevent its movement in the directions of arrows I or J. As shown in FIG. 7A, stops 300 and 302 are provided on wiper support 226 or, alternatively, on housing 220, so that guide 224 may rotate 90 degrees between position X and position Y. Stops 300 and 302 may be detents. As shown in FIG. 7, to read dip stick 208 following wiping, guide 224 is rotated from position shown in FIG. 6 in the direction of arrow G, say 90°. Rotation to position X causes dip stick 208 to block wipers 204 from engaging face 212 and face 216 of dip stick 208. Also, as shown in FIG. 7A, lower support 240 will likewise be rotated to position X by rotation of guide 224 to this position so that lower stop 240 may now pass hole 242. Lower stop 240 should be sized to pass freely through hole 228 too. Accordingly, as shown in FIG. 8, when dip stick 208 is withdrawn with guide 224 in the direction of arrow D, dip stick 208 may then be read without having oil wiped off by wipers 204.

Figure 9A:
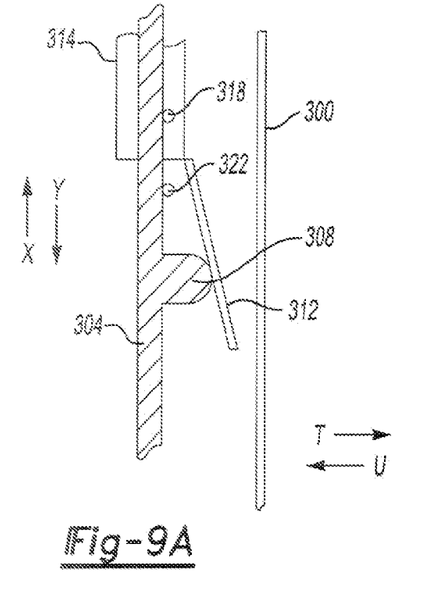
FIG. 9A illustrates another version of a dip stick assembly according to the invention with wipers disengaged.

FIG. 9A illustrates another version of the invention. As shown, dip stick 300 is disposed in housing 304, which is only partially shown. Here, the invention is shown schematically but one of ordinary skill in the art would understand that housing 304 may surround dip stick 300 as known. Housing 304 has block 308, which is here a protrusion extending from its surface toward dip stick 300. Wiper 312 is shown out of contact with dip stick 300 and resting on block 308. Wiper 312 may be resiliently biased away from contact with dip stick 300. Further, wiper 312 is pivotally mounted on carrier 314, which is slideably received on housing 304 and is configured to move up in the direction of arrow X or down in the direction of arrow Y. Wiper 312 may pivot in the direction of arrow T to move toward dip stick 300 or in the direction of arrow U away from dip stick 300.

Figure 9B:
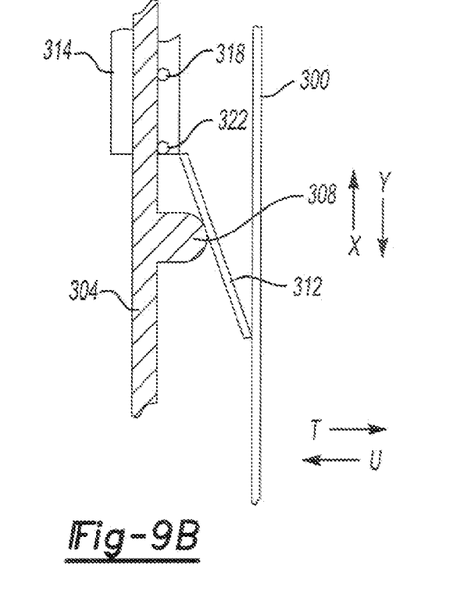
FIG. 9B illustrates the version of the dip stick assembly of FIG. 9A with the wipers engaged.

To place wiper 312 in contact with dip stick 300, as shown in FIG. 9B, carrier 314 slides down housing 304 in the direction of arrow Y, which causes wiper 312 to pivot in the direction of arrow T on block 308. As dip stick 300 is withdrawn from housing 304 in the direction of arrow X, wiper 312 then cleans dip stick 300 of excess oil. Dip stick 300 is then returned to housing 304 in the direction of arrow Y. Carrier 314 is then moved in the direction of arrow X, causing wiper 312 to pivot away from dip stick 300 in the direction of arrow U so that dip stick 300 may then be withdrawn to take an accurate measurement of the oil level on dip stick 300 without being wiped by wiper 312. Detents 318 and 322, such as an indentation and receiving protrusion, may be provided to lock carrier 314 momentarily in position where wiper 312 is in contact with dip stick 300 and in position where wiper 312 is out of contact with dip stick 300.

Figure 10A:
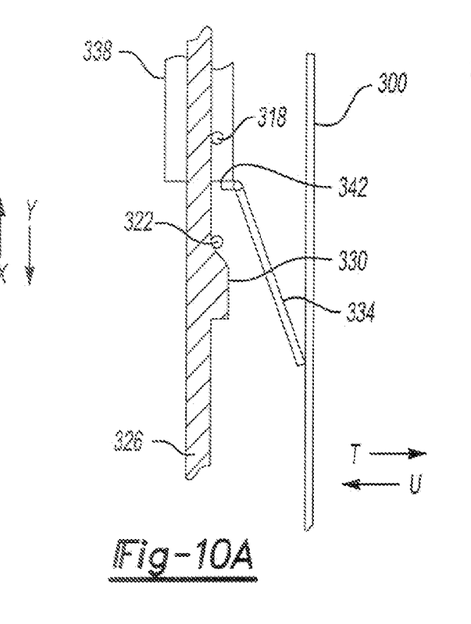
FIG. 10A shows another version of the invention with wipers engaged.
Figure 10B:
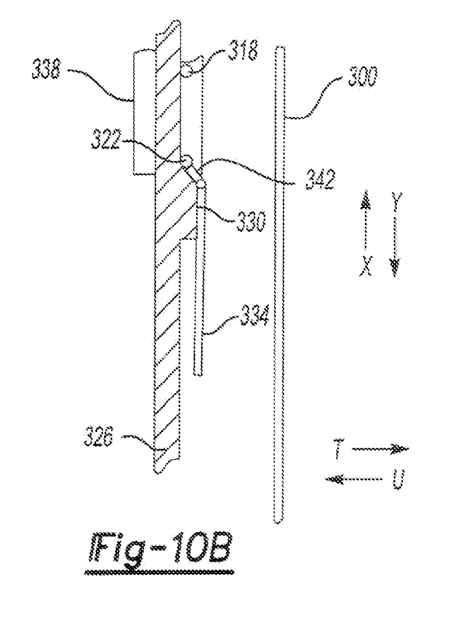
FIG. 10B shows the version of the invention of FIG. 10A with wipers disengaged.

Turning now to FIGS. 10A and 10B, another version of the invention is shown. FIG. 10A shows housing 326 having block 330 extending toward dip stick 300. Wiper 334 is provided and pivotally mounted to carrier 338, which is slideably mounted to housing 326. Wiper 334 may be resiliently biased into contact with dip stick 300 as shown. Carrier 338 may be held momentarily in place by detent 318 here. Wiper 334 is also provided with catch 342. With wiper 334 in contact with dip stick 300, dip stick 300 may be withdrawn in the direction of arrow X to clean it of excess oil. Dip stick 300 may then be returned in the direction of arrow Y so that it may measure the oil level of the reservoir.

To prevent wiper 334 from wiping dip stick 300, carrier 338 is then moved in the direction of arrow Y along housing 326, overcoming the resistance to movement provided by detent 318 to a position on housing 326 shown in FIG. 10B, wherein detent 322 is engaged to momentarily hold carrier 338 in place. In this position, as shown, catch 342 of wiper 334 moves into contact with block 330, causing wiper 334 to swing away from dip stick 300 in the direction of arrow U. Wiper 334 may then be withdrawn from housing 326 again so that the fill level of oil may be correctly checked. After checking, carrier 338 may be moved back up in the direction of arrow X. Block 330 no longer holds wiper 334 out of contact with dip stick 330. Due to its resilient bias, wiper 334 returns in the direction of arrow T to its position in contact with dip stick 300 as shown in FIG. 10A.

In addition, while dip sticks have been shown as flat, dip sticks may be round with contoured wipers to engage the round cylindrical shape of the dip stick. In this way, dip stick need not be oriented relative to the wipers as the entire contoured surface of the dip stick would be wiped by the contour wipers.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A dip stick assembly, comprising:
   a dip stick for measuring fluid;
   a wiper for wiping fluid from said dip stick, said wiper having an engaged position and a disengaged position wherein said engaged position is in contact with said dip stick and said disengaged position is out of contact with said dip stick; and
   a block selectively allowing said wiper to move between said engaged position and said disengaged position.

2. The dip stick assembly of claim 1 wherein said wiper is resiliently biased toward said engaged position.

3. The dip stick assembly of claim 1 wherein said wiper is resiliently biased toward said disengaged position.

4. The dip stick assembly of claim 1 wherein said wiper is disposed relative to said housing to direct fluid wiped by said wiper into said housing.

5. The dip stick assembly of claim 1 wherein said block has a blocking position for maintaining said wiper in said disengaged position and an unblocking position for allowing said wiper to be in said engaged position when in said unblocking position.

6. The dip stick assembly of claim 5 wherein said block is selectively engageable to said dip stick.

7. The dip stick assembly of claim 6 wherein said block is in contact with said dip stick by a release having a released position and an unreleased position, said released position permitting said block to move relative to said dip stick and said unreleased position coupling said block to said dip stick.

8. The dip stick assembly of claim 7 wherein said block is disposed in said blocking position when released.

9. The dip stick assembly of claim 8 wherein said wiper is blocked from moving to said engaged position by said block when said block is in said blocking position.

10. The dip stick assembly of claim 5 wherein said block is rotatable between a blocking position and an unblocking position.

11. The dip stick assembly of claim 1 wherein said wiper is pivotable between said engaged position and said disengaged position.

12. The dip stick assembly of claim 1 wherein said block is said dip stick.

13. The dip stick assembly of claim 12 including a guide for orienting a face of said dip stick relative to said wiper.

14. The dip stick assembly of claim 13 wherein said guide is rotatable to allow rotation of said dip stick between a blocking position and an unblocking position.

15. A dip stick assembly, comprising:
   a dip stick for measuring fluid, said dip stick having a face with a gauge for measuring fluid;
   a wiper for wiping fluid from said face of said dip stick, said wiper having an engaged position and a disengaged position wherein said engaged position is in contact with said face of said dip stick and said disengaged position is out of contact with said face of said dip stick; and
   wherein said wiper is resiliently biased toward contact with said dip stick.

16. The dip stick assembly of claim 15 including a block having a blocking position for maintaining said wiper in said disengaged position and an unblocking position for permitting said wiper to be in said engaged position when in said unblocking position, wherein said block is selectively engageable to said dip stick.

17. The dip stick assembly of claim 16 wherein said block is engaged to said dip stick by a release having a released position and an unreleased position, said released position permitting said block to move relative to said dip stick and said unreleased position coupling said block to said dip stick.

18. The dip stick assembly of claim 17 wherein said block is disposed in said blocking position when released.

19. The dip stick assembly of claim 15 wherein said wiper is secured to a housing in communication with an oil reservoir.

20. A method for wiping a dip stick, the method comprising the steps of:
   a) disposing a dip stick having a measure in fluid communication with an oil reservoir;
   b) resiliently biasing a wiper into engagement with the dip stick;
   c) wiping the measure of the dip stick;
   d) preventing the wiper from engaging the measure of the dip stick by blocking the wiper from contacting the measure of the dip stick; and
   e) withdrawing the dip stick from the oil reservoir.

* * * * *